United States Patent [19]

Ohtani et al.

[11] Patent Number: 4,542,070

[45] Date of Patent: Sep. 17, 1985

[54] PROCESS FOR ADHERING POLYURETHANE ELASTOMER TO METAL

[75] Inventors: Masaaki Ohtani, Yokohama; Takao Harada; Yoshijiro Oyaizu, both of Shizuoka; Tatsuhiko Kobayashi, Yokohama, all of Japan

[73] Assignees: Mitsubishi Chemical Industries Ltd.; Ihara Chemical Industry Co., Ltd., both of Tokyo, Japan

[21] Appl. No.: 602,081

[22] Filed: Apr. 9, 1984

Related U.S. Application Data

[63] Continuation of Ser. No. 373,108, Apr. 29, 1982, abandoned.

[30] Foreign Application Priority Data

May 8, 1981 [JP] Japan ................................ 56-69131

[51] Int. Cl.$^4$ ............................ B32B 15/08; C09J 5/04
[52] U.S. Cl. ................................ 428/416; 156/307.5; 156/315; 156/330; 156/331.7; 156/333; 427/333; 427/410; 428/423.3
[58] Field of Search ............... 427/333, 410; 428/416, 428/423.3; 156/307.5, 314, 331.7, 315, 330, 333

[56] References Cited

U.S. PATENT DOCUMENTS

| | | | |
|---|---|---|---|
| 2,706,166 | 4/1955 | Gurney | 156/315 |
| 3,425,886 | 2/1969 | Heins | 428/416 |
| 3,759,751 | 9/1973 | Smith | 428/416 |
| 3,988,257 | 10/1976 | Harrison et al. | 427/410 |
| 4,079,168 | 3/1978 | Schwemmer et al. | |
| 4,179,537 | 12/1979 | Rykowski | 427/333 |
| 4,336,171 | 6/1982 | Kohlstadt et al. | 156/333 |

FOREIGN PATENT DOCUMENTS 984293 2/1965 United Kingdom ................ 427/410

*Primary Examiner*—John J. Gallagher
*Attorney, Agent, or Firm*—Oblon, Fisher, Spivak, McClelland & Maier

[57] ABSTRACT

A polyurethane elastomer and a metal are strongly adhered by using (1) a composition containing a polyepoxy compound and a polyamine compound and (2) a composition containing an isocyanate compound having a concentration of isocyanate group of 15-50% by weight. An adhered composite article thus obtained has excellent water resistance and heat resistance.

7 Claims, No Drawings

PROCESS FOR ADHERING POLYURETHANE ELASTOMER TO METAL

This application is a continuation, of application Ser. No. 373,108, field Apr. 29, 1982, now abandoned.

BACKGROUND AND DETAILED DESCRIPTION OF THE INVENTION

The present invention relates to a process for adhering polyurethane elastomer to metal to obtain an adhered composite article having excellent water resistance and heat resistance.

As a polyurethane elastomer has superior physical properties to other synthetic elastomers and rubbers, it is used as an engineering plastic material. Recently while attracting attention to the properties of polyurethane elastomer, a technology to improve the durability of the metal by coating the surface of a metal article with polyurethane elastomer has been developed. As an adhesive for adhering polyurethane elastomer to the metal surface, phenolic resins or epoxy resins have hitherto been known. Such resins have been utilized in adhering high temperature cure castable polyurethane elastomer to the metal and the physical properties and adhesive property of the thus prepared polyurethane elastomer is improved by heating the cast elastomer for a long period from a few hours to one day at a temperature of 100° to 150° C.

In the case of adhering polyurethane elastomer to metal, it is uneconomic from the energy view point to maintain the cast polyurethane elastomer for a long period at such a high temperature, and it is difficult to carry out the casting at a high temperature. Although a process for casting polyurethane elastomer at a lower temperature for a shorter period has been proposed, in the case where adhesion of metal and polyurethane elastomer is carried out at a relatively low temperature of 20° to 80° C. by casting while utilizing the abovementioned phenolic resin or epoxy resin, the thus obtained adhered composite article shows the peel strength of only 1 to 2 kg/cm.

As a result of studying methods for obtaining an adhered article in which metal and polyurethane elastomer are strongly adhered together even when polyurethane elastomer is cast at a low temperature, the present inventors have found that by using the two specified adhesive compositions, polyurethane elastomer is adhered to metal with a sufficiently large adhesive strength and adhered composite article thus obtained has excellent water resistance and heat resistance even if the polyurethane elastomer is cast at a low temperature.

Namely, the present invention relates to a process for adhering polyurethane elastomer and a metal which comprises coating the surface of the metal with a composition containing a polyepoxy compound and a polyamine compound, further coating the thus coated surface with a composition containing an isocyanate compound having an isocyanate group concentration of 15 to 50% by weight and casting the polyurethane elastomer onto the thus double coated surface of the metal followed by hardening the whole system.

The present invention will be further explained more in detail as follows:

In the process of the present invention, two kinds of adhesive compositions are used. The composition containing both the polyepoxy compound and the polyamine compound is referred to as the primary primer, and the composition containing the isocyanate compound is referred to as the secondary primer.

The polyepoxy compound used as the major component of the primary primer is preferably a compound having terminal epoxy groups which is prepared by adding epichlorohydrin to bisphenol A and has an average molecular weight of 300 to 4,000; a polyepoxy compound prepared by reacting epichlorohydrin with polyphenolic resin obtained by condensing a phenolic compound such as phenol, cresol, resorcinol, and the like with an aldehyde such as formaldehyde, glyoxal, acrolein, and the like. It is possible to use commercialized polyepoxy compounds, for instance, Epikote®-828, -1001, -1004, -1009, -152 and -154 (manufactured by Yuka-Shell Epoxy Co.) or Araldite® EPN-1138 and -1139, and ECN-1235, -1273 and -1280 (manufactured by Ciba-Geigy Ltd.) and the like. These polyepoxy compounds are used singly or as mixtures thereof. In the case where a highly heat resistant product is required, epoxy compounds prepared by reacting polyphenolic resin and epichlorohydrin are preferable.

As the polyamine compound used as a hardening agent in the primary primer various kinds of hardening agents, including commercially known hardening agents are used.

For instance, a polyamine such as diethylenetriamine, tetraethylenepentamine, hexamethylenediamine, propylenediamine, trimethylhexamethylenediamine, isophoronediamine, menthenediamine, xylylenediamine and the like; a reaction product of such polyamine with an epoxy compound such as 1,4-butanediol diglycidylether, glycerine triglycidylether, bisphenol-A diglycidylether and the like; a compound having terminal amino groups which is synthesized from a dimer acid and a polyamine such as ethylenediamine, propylenediamine, hexamethylenediamine, diethylenetriamine, xylylenediamine and the like, which is commercially available as Versamide®-115, -125 and -140 (product of Japan Henkel Co.); a compound obtained by the Mannich reaction of formaldehyde and a phenolic compound such as phenol and cresol and a secondary amine such as dimethylamine and diethylamine; or a polyamine obtained by the reaction of an aromatic amine such as aniline and toluidine and an aldehyde such as formaldehyde can be used. In the case where a highly water resistant and heat resistant product are required, it is preferable to use an aromatic compound such as xylylenediamine, its epoxidized product and its amidation product.

It is more preferable to prepare the primary primer by combining the epoxy compound obtained by reacting epichlorohydrin with polyphenolic resin as the major component and xylylenediamine or a compound having terminal amino groups obtained by reacting a part of xylylenediamine with an epoxy compound as the hardening agent.

For further improving the adhesive properties and water resistance of the adhered composite article, it is preferable to add a silane coupling agent to the primary primer.

As the silane coupling agent, γ-glcidoxypropyltrimethoxysilane, γ-aminopropyltriethoxysilane, γ-mercaptopropyltrimethoxysilane and the like or the reaction product of γ-glycidoxypropyltrimethoxysilane with γ-aminopropyltriethoxysilane or γ-mercaptopropyltrimethoxysilane is preferable.

In addition, the following additives may be added further to the primary primer. For example, an extender pigment such as talc, clay, calcium carbonate, calcium sulfate, alumina, silica, calcium silicate and the like; a colour pigment such as titanium oxide, carbon black, iron oxide, lead oxide, ultramarine blue, phthalocyanine blue and the like; an anti-corrosive pigment such as lead silicate, calcium plumbate, lead chromate and the like and an antisetting agent such as colloidal silica, asbestos, hydrogenated castor oil and the like are optionally added.

The major component, the hardening agent and the additives are generally mixed with a solvent to prepare the primary primer.

The solvent for the primary primer is a compound which dissolves both the polyamine compound and the polyepoxy compound, and for instance, toluene, xylene, ethylbenzene, methyl ethyl ketone, methyl isobutyl ketone, methyl cellosolve, ethyl cellosolve, butyl cellosolve, an acetate ester of a cellosolve compound, etc. may be used for the purpose.

The equivalent ratio of the polyepoxy compound to the polyamine compound is in a range of 0.5/1 to 1/0.5.

The amount of the silane coupling agent is preferably 0.01 to 20% by weight to the total weight of the polyepoxy compound and the polyamine compound (hereinafter simply referred to as the total weight of the resins). The amount of the pigment is preferably 1 to 500% by weight to the total weight of the resins.

The solvent is used in such amount that the primary primer has a viscosity suitable for coating depending on the required operating conditions. In general, the solvent is used in an amount to make the solution having a concentration of 2 to 90% by weight of the total resins.

As the isocyanate compound having a concentration of isocyanate group of 15–50% by weight, preferably 20–35% by weight which is used as a component of the secondary primer (a concentration of isocyanate means the percentage by weight of isocyanate groups in the isocyanate compound, referred to as NCO% hereinafter), an aliphatic, cycloaliphatic or aromatic isocyanate monomer having at least two NCO groups in its molecule, a mixture thereof or a modified compound thereof is used. Examples of the isocyanate, compound are tolylene diisocyanate (2,4- and/or 2,6-isomers), xylylene diisocyanate, naphthylene diisocyanate, diphenylmethane diisocyanate (MDI), polynuclear polyisocyanate obtained by reacting phosgene with condensation product of aniline and formaldehyde (so-called crude MDI), carbodiimide-modified diphenylmethane diisocyanate and the like. In addition, urethane prepolymer having terminal isocyanate groups which is obtained by reacting the above isocyanate compound with polyhydroxy compound can be used.

The urethane prepolymer includes a reaction mixture of an isocyanate compound and the polyhydroxy compound containing the unreacted isocyanate compound. In this case, the NCO% means the weight per cent of the isocyanate groups in the reaction mixture.

As the polyhydroxy compound, polyether polyol and polyester polyol which are generally used for synthesizing polyurethane are used. For instance, polyalkylene ether polyol of average molecular weight of 300 to 10,000 obtained by adding alkylene oxide such as ethylene oxide, propylene oxide, butylene oxide and the like to polyhydroxy alcohol such as ethylene glycol, propylene glycol, glycerol, pentaerythritol, sorbitol, sucrose and the like; polytetramethylene ether glycol of average molecular weight of 600 to 10,000 obtained by ringopening polymerization of tetrahydrofuran and the like; polyester polyol of average molecular weight of 300 to 6,000 obtained by condensation of bifunctional alcohol such as ethylene glycol, propylene glycol, 1,4-butanediol, hexylene glycol, diethylene glycol, dipropylene glycol and the like with dicarboxylic acid such as adipic acid, succinic acid, azelaic acid, phthalic acid and the like and compounds having terminal hydroxy group and average molecular weight of 300 to 6,000 obtained by ring-opening polymerization of caprolactone are used.

Under normal conditions, isocyanate compounds having NCO% of 15 to 50% are actually usable. When the NCO% is less than 15% strongly adhered composite article can not be obtained. On the other hand, when the NCO% is higher than 50% the adhered surface becomes brittle. The favorable range of the NCO% is 20 to 35%. In addition, in order to accelerate the generation of strong adhesive strength, an aromatic polyisocyanate, for instance, MDI, crude MDI, carbodiimide-modified MDI, or urethane prepolymer thereof is preferable.

In addition, it is preferable to add a high polymeric compound such as chlorinated rubber, chlorinated polyolefin, polyether, polyester or polyurethane, the latter three respectively has weight average molecular weight (determined by gel-permeation chromatography) of more than 10,000 to the secondary primer.

In the present invention, weight average molecular weight is measured by liquid chromatography after calibration by standard polystyrene. A differential refractometer is used as a detector.

The weight average molecular weight is calculated as comparison between the size of polystyrene molecule and that of the high polymeric compound. Weight of each of molecule is calculated on the assumption that a refractive index of each of molecule is same. The calculation is performed by the following equation.

$$\overline{M}w = \frac{\Sigma M_i W_i}{\Sigma W_i}$$

$\overline{M}w$ : weight average molecular weight
$M_i$: molecular weight
$W_i$: weight of molecular weight of $M_i$ (the weight is proportional to height of peak shown in the chart)

By adding such a high polymeric compound as a component to the secondary primer, the coating performance of the secondary primer is improved and the time for exhibiting the adhesive strength is shortened.

Chlorinated rubber is the addition product of chlorine to rubber and which is represented by the molecular formula of $(C_5H_7Cl_3)_x(C_5H_6Cl_4)_y(C_{10}H_{11}Cl_4)_z$ and has weight average molecular weight of 5,000 to 100,000 and chlorine content of about 60% by weight. In order to obtain a favorable adhered composite article, it is preferable to use a compound of higher molecular weight.

As the chlorinated polyolefin, chlorinated polyethylene or chlorinated polypropylene which has weight average molecular weight of 5,000 to 60,000 and chlorine content of 60 to 70% by weight may be preferably used. Such a chlorinated polyolefin should be soluble into the solvent, for example, an aromatic hydrocarbon such as toluene or methyl ethyl ketone and the like, to the extent of at least 30% by weight.

As the polyether or polyester, the same kind of polyether polyol and polyester polyol which are used for preparing the afore-mentioned urethane prepolymer and having weight average molecular weight of more than 10,000 are used. As the polyester, commercialized product for instance, PLACCEL ® H-1, PLACCEL H-4 or PLACCEL H-7 (manufactured by DAICEL Ltd.) is used.

As the polyurethane, the same kind of a reaction product of isocyanate compound and polyether polyol or polyester polyol, which is produced for the afore-mentioned urethane prepolymer and has weight average molecular weight of more than 10,000 is used. The polyurethane may have either the terminal isocyanate group or the terminal hydroxy group, however, it is preferable to use the polyurethane having the terminal hydroxy group for the reason of can stability. These high polymeric compound are used in an amount of 0.05 to 3, preferably 0.1 to 2 parts by weight to one part by weight of the isocyanate compound.

The secondary primer is also used in combination with a solvent.

As the solvent for the secondary primer, a solvent which dissolves the isocyanate compound and the high polymeric compound and is inert to isocyanate groups, for instance, toluene, xylene, methyl ethyl ketone, methylene chloride, cellosolve acetate, methyl isobutyl ketone, trichloroethylene, ethyl acetate, butyl acetate and the like, is used in an amount of 0.4 to 30 times, preferably, 0.5 to 10 times by weight to the total weight of the isocyanate compound and the high polymeric compound.

Further, a polar solvent which strongly swells the urethane prepolymer and polyurethane, for instance, dimethylformamide, dimethylacetamide, dimethylsulfoxide, N-methyl-pyrrolidone and the like is preferably used for improving the adhesion of the primary primer and polyurethane elastomer. Such a polar solvent is used in amount of 1 to 100% by weight, preferably 3 to 70% by weight to the total weight of resin components.

By using the primary primer and the secondary primer of the above-mentioned compositions, the polyurethane elastomer will firmly adhere to the metal at a low temperature and to obtain adhered composite article which has excellent water resistance and heat resistance.

In addition, in order to obtain adhered composite article in which the polyurethane elastomer and the metal are strongly adhered together, it is preferable that either or both of the conditions of (a) the primary primer contains the silane coupling agent and (b) the second primer contains the high polymeric compound are satisfied. However in the case where the primary primer is used in such an amount that the dried film thereof has a thickness, which will be described later, of 10–50 microns, a sufficient adhesive strength can be obtained without using both the silane coupling agent and the high polymeric compound.

The polyurethane elastomer used in the present invention is prepared generally by mixing a solution (the first component) of the prepolymer containing isocyanate groups obtained by the reaction of polyisocyanate compound with polyoxyalkylene polyol or polyester polyol and a solution (the second component) containing polyoxyalkylene polyol(or polyester polyol), a chain extender, a catalyst, etc. and casting the mixture (this mixture of the first component and the second component is hereinafter referred to as the raw material for polyurethane elastomer).

Polyoxyalkylene polyol used in the first and second component is preferably the compound obtained by adding ethylene oxide, propylene oxide, butylene oxide and the like to ethylene glycol, propylene glycol, 1,4-butanediol, glycerol, trimethylolpropane, and the like, or the compound obtained by ring-opening polymerization of tetrahydrofuran, and those having average molecular weight of 700 to 10,000 are suitably used.

As the polyester polyol used in the first and second component, the compound having terminal hydroxy group and average molecular weight of 700 to 6,000 obtained by condensation of bifunctional alcohol such as ethylene glycol, propylene glycol, 1,4-butanediol, hexylene glycol, diethylene glycol, dipropylene glycol and the like with dicarboxylic acid such as adipic acid, succinic acid, azelaic acid, phthalic acid and the like and the compound having terminal hydroxy group and average molecular weight of 700 to 6,000 obtained by ring-opening polymerization of caprolactone are preferably used. The bifunctional alcohol and dicarboxylic acid may be used singly or in combination. Also the polyoxyalkylene polyol and polyester polyol may be used singly or in combination.

As the polyisocyanate compound used as the starting material of the prepolymer in the first component, diisocyanate compound such as tolylene diisocyanate, 4,4'-diphenylmethane diisocyanate, naphthylene diisocyanate, partially carbodiimidemodified 4,4'-diphenylmethane diisocyanate and the like are preferable. Isocyanate concentration of the prepolymer is 2 to 25% by weight, preferably 2 to 15% by weight, from the viewpoint of reaction rate and properties of the cast product.

As the chain extender, short chain diol such as ethylene glycol, 1,4-butanediol, dipropylene glycol, hexylene glycol and the like, and aromatic diamine such as methylene-bis (o-chloroaniline), methylenedianiline and the like may be used.

The catalyst contained in the second component is those which are generally used for acceleration of urethaneformation, for example, are tertiary amine catalyst such as diazabicyclooctane and the like, and organometallic compound such as stannous octoate, dibutyltin dioctoate, dibutyltin dilaurate, lead octoate and the like.

The metal to which polyurethane elastomer is adhered is iron, aluminum, copper, zinc or alloys containing these metals.

The process of this invention is especially suitable for adhering polyurethane elastomer to the metal at a temperature of lower than 80° C.

Adhesion of polyurethane elastomer to the metal is carried out as follows:

The solution of the primary primer is coated on the surface of the metal so that the thickness of the dried film of the primary primer is 5 to 200 microns, preferably 10 to 150 microns and the coated metal is allowed to stand for more than 2 hours at 20° C. or for more than 30 min. at about 60° C. The water resistance of the adhered article is more improved by heating at a higher temperature. After confirming that the surface of the coated metal has come to be tack-free (non-tacky), the solution of the secondary primer is coated on the surface of the coated metal so that the thickness of the dried film of the secondary primer is less than 200 microns, preferably 10 to 150 microns, and the thus double coated metal is allowed to stand until the solvent has evaporated off, generally, for less than 3 hours. Then the raw material for polyurethane elastomer is poured onto the coated metal. After leaving the thus cast material for about a week at an ambient temperature, the strength of the polyurethane elastomer has been stabilized with the sufficient strength of adhesion. In the case where a strongly adhered composite article is required, the cast material can be heated at a temperature of higher than 100° C. after pouring raw material for polyurethane elastomer on the double coated metal.

As has been precisely described as above, according to the process of the present invention, even though the raw material for polyurethane elastomer which is hardened at a relatively lower temperature is used, a product having favorable adhesion is available at a low temperature without heating after casting. Furthermore, the water resistance and heat resistance of the thus prepared product is excellent.

The present invention will be further explained more in detail while referring to non-limitative examples as follows:

In the following examples, the weight average molecular weight is measured as set forth below.

High speed liquid chromatography HLC-802A (manufactured by TOYO SODA MANUFACTURING CO., LTD.) is provided with four separation columns for gel permeation including mainly copolymer of styrene and divinylbenzene. The separation columns are two columns of G-2000H-8, one column of G-3000H-8 and one column of G-4000H-8. The column of G-2000H-8 is available for the separation of the compound having a molecular weight of up to 10,000, the column of G-3000H-8 is available for the separation of the compound having a molecular weight of up to 60,000 and the column of G-4000H-8 is available for the separation of the compound having a molecular weight of up to 400,000.

The columns are manufactured by TOYO SODA MANUFACTURING CO., LTD., respectively. The differential refractometer is chosen as a detector. Tetrahydrofuran is used as a solvent. The condition of the column is stabilized at a temperature of 40° C. for about 4 hours while flowing the solvent through the column at a flow rate of 1.1 ml/min. The standard polystyrene is purified into the polymers having the ratio of weight average molecular weight (Mw) to number average molecular weight (Mn) being from 1.01 to 1.05. A few kinds of purified standard polystyrenes having a different molecular weight are mixed into tetrahydrofuran to make a solution having a concentration of polystyrene of 3% by weight.

The distribution curve of molecular weight is obtained by injection of the prepared solution into the apparatus of high speed liquid chromatography. The relation between retention time and molecular weight is plotted on the semilog-section paper and then the standard curve is drawn. On the other hand, the distribution curve of molecular weight relating to the synthesized high polymer material is drawn in a similar manner as above. The weight average molecular weight is calculated from the following equation based on the drawn curve.

$$\overline{M}w = \frac{\Sigma MiWi}{\Sigma Wi}$$

$\overline{M}w$ : Weight average molecular weight
Mi : Molecular weight
Wi : Height of peak of molecular weight Mi on the drawn curve

PREPARATIVE EXAMPLE

I. Preparation of the primary primer (I-A) Preparation of the major component A mixture of the polyepoxy compound, the silane coupling agent and the solvent shown in Table 1 was stirred at 60° C. to obtain a uniform solution. Into 600 g of this solution, the pigment shown in Table 1 was added and the mixture was kneaded in a paint mill to prepare the major component of the primary primer. The amount of each component are also shown in Table 1.

(I-B) Preparation of the hardening agent

I-B-1: Preparation of Hardening agent A-1

270 g of xylylenediamine and 60 g of Epikoat ® 828 were mixed and heated at 90° C. under stirring for 5 hours. By adding 170 g of xylene, 90 g of butyl cellosolve and 170 g of methyl ethyl ketone to the reaction product, a uniform solution was obtained. This solution was named as Hardening agent A-1.

I-B-2: Preparation of Hardening agent A-2

100 g of Tohmide ® 215 (polyamide of dimer acid, manufactured by Fuji Kasei Co.), 60 g of xylene, 20 g of butylcellosolve and 40 g of methyl ethyl ketone were mixed under stirring at a room temperature to obtain a uniform solution. This solution was named as Hardening agent A-2.

I-B-3: Preparation of Hardening agent A-3

550 g of 3,9-bis(3-aminopropyl)-2,4,8,10-tetraoxaspiro-[5,5]-undecane and 100 g of 1,4-butanediol diglycidylether were heated at 80° C. for 5 hours under stirring. To the reaction product, 200 g of xylene, 50 g of butylcellosolve, 400 g of methyl ethyl ketone and 100 g of methyl isobutyl ketone were added to obtain a uniform solution. This solution was named as Hardening agent A-3.

II. Preparation of the secondary primer (II-A) Preparation of urethane prepolymer Polyisocyanate compound and polyhydroxy compound were heated at 80° C. for 3 hours to prepare the urethane prepolymer. The amount of each reactant and the NCO% of the thus prepared urethane prepolymer is shown in Table 2.

(II-B) Preparation of the high polymeric compound 4,4'-diphenylmethane diisocyanate (MDI) or a mixture of 80% by weight of 2,4-tolylene diisocyanate and 20% by weight of 2,6-tolylene diisocyanate (80/20 TDI) and various kind of polyhydroxy compounds shown in Table 3 were mixed with dehydrated toluene, and the mixture was heated at 80° C. or 3 hours to prepare the high polymeric compound (polyurethane). The amounts of reactants, names of the polyhydroxy compounds and the weight average molecular weight of the thus prepared polyurethane are shown also in Table 3.

(II-C) Preparation of the secondary primer

The secondary primers were prepared by mixing the urethane prepolymers obtained in (II-A) or various polyisocyanate compounds, with polyurethane obtained in (II-B) or various high polymeric compounds in the solvents. The type and amount of each component are shown in Table 4.

TABLE 1

Recipe for preparing the major component of the primary primer unit: gram

| Product | E-1 | E-2 | E-3 | E-4 | E-5 | E-6 | E-7 | E-8 |
|---|---|---|---|---|---|---|---|---|
| Material | | | | | | | | |
| Polyepoxycompound | | | | | | | | |
| Epikote® 828[1] | 200 | 200 | | | | 200 | | 200 |
| Epikote 1001[2] | 250 | | 400 | | | | | |
| Epikote 1009[3] | | 250 | | | | | | |
| Epikote 152[4] | | | | 450 | | | | |
| Epikote 154[5] | | | | | 450 | | | 200 |
| Araldite® ECN-1235[6] | | | | | | 200 | | |
| Araldite ECN-1280[7] | | | | | | | 450 | |
| Solvent | | | | | | | | |
| xylene | 150 | 150 | 150 | 150 | 150 | 150 | 150 | 150 |
| butylcellosolve | 50 | 50 | 50 | 50 | 50 | 50 | 50 | 50 |
| methyl ethyl ketone | | 50 | | | | | | |
| Silane coupling agent[8] | 10 | 10 | 10 | 10 | 10 | 10 | 10 | 10 |
| Pigment | | | | | | | | |
| calcium silicate | 50 | 50 | | 200 | 200 | 100 | 100 | 50 |
| calcium carbonate | | | 50 | | | | | |
| titanium oxide | 350 | 350 | 300 | 200 | 200 | 200 | 200 | 350 |
| Aerozil® 200#[9] | 10 | 10 | 10 | 10 | 10 | 10 | 10 | 10 |

Notes on Table 1:
[1]Reaction product of bisphenol A and epichlorohydrin, epoxy equivalent: 189. Manufactured by Yuka Shell Epoxy Co.
[2]The same as [1] except for the epoxy equivalent of 480.
[3]The same as [1] except for the epoxy equivalent of 2900.
[4]The same as [1] except for the epoxy equivalent of 175.
[5]The same as [1] except for the epoxy equivalent of 179.
[6]Reaction product of cresol-novolac and epichlorohydrin having epoxy equivalent of 200. Manufactured by Ciba Geigy Ltd.
[7]The same as [6] except for the epoxy equilvalent of 230.
[8]γ-glycidoxypropyltrimethoxysilane
[9]colloidal silica. Manufactured by Nippon Aerozil Co.

TABLE 2

Recipe for the urethane prepolymer and its NCO %

| Product No. | Polyisocyanate compound Name | amount (g) | Polyhydroxy compound Name | amount (g) | NCO % |
|---|---|---|---|---|---|
| p-1 | Crude MDI[1] | 270 | PTMG-1000[4] | 49 | 25 |
| p-2 | " | 270 | " | 31 | 27 |
| p-3 | " | 270 | " | 105 | 20 |
| p-4 | " | 270 | PTMG-2000[5] | 57 | 25 |
| p-5 | " | 270 | G-3000[6] | 57 | 25 |
| p-6 | " | 270 | G-700[7] | 38 | 25 |
| p-7 | Pure MDI[2] | 270 | PTMG-1000 | 70 | 25 |
| p-8 | 80/20-TDI[3] | 270 | " | 188 | 25 |
| p-9 | Crude MDI | 270 | Nipporan® 4042[8] | 36 | 27 |
| p-10 | Pure MDI | 270 | PTMG-1000 | 50 | 27 |
| p-11 | 80/20-TDI | 270 | " | 160 | 27 |

Notes:
[1]Product of The Upjohn Co. sold under the trading name of PADI 135.
[2]Product of The Upjohn Co. sold under the trading name of 125 M.
[3]Product of Mitsubishi Chemical Industries Limited.
[4]Polytetramethylene ether glycol, Product of Mitsubishi Chemical Industries Limited number average molecular weight of 1,000.
[5]The same as [4] except for number average molecular weight of 2000.
[6]Addition product of propylene oxide to glycerol, Product of Asahi Denka Kogyo Co. number average molecular weight of 3000.
[7]The same as [6] except for number average molecular weight of 700.
[8]Ester obtained from ethylene glycol, butylene glycol and adipic acid, Product of Nippon Polyurethane Kogyo Co. number average molecular weight of 2000.

TABLE 3

Recipe for polyurethane and its average molecular weight

| Product No. | Polyisocyanate compound Name | amount (g) | Polyhydroxy compound Name | amount (g) | Toluene (g) | Weight average molecular weight |
|---|---|---|---|---|---|---|
| G-1 | 80/20-TDI | 87 | 700[1] | 350 | 440 | 22,000 |
| G-2 | " | 87 | BPX-33[2] | 285 | 370 | 32,000 |
| G-3 | " | 70 | BPX-55[3] | 320 | 390 | 15,000 |
| G-4 | " | 70 | PLACCEL 208[4] | 340 | 410 | 32,000 |
| G-5 | " | 35 | PLACCEL 220[5] | 400 | 435 | 26,000 |
| G-6 | MDI | 125 | BPX-33 | 285 | 410 | 33,000 |
| G-7 | " | 100 | PLACCEL 208 | 340 | 440 | 32,000 |

Notes:
[1]Trading name of polypropyleneetherglycol of hydroxy value of 160, made by Asahi Denka Kogyo Co.
[2]Trade name of addition product of propylene oxide to bisphenol A with the hydroxy value of 195, made by Asahi Denka Kogyo Co.
[3]The same as [2] except for the hydroxy value of 140.
[4]Trading name of product of ring-opening polymerization of epsilon-caprolactone of hydroxy value of 130, made by Daicel Ltd. PLACCEL is registered trade mark.
[5]The same as [4] except for the hydroxy value of 50.

TABLE 4

Recipe for the secondary primer

| Product No. | Isocyanate compound Name | Amount (g) | High polymeric compound Name | Amount (g) | Solvent Name | Amount (g) | Name | Amount (g) |
|---|---|---|---|---|---|---|---|---|
| U-1 | P-1 | 100 | CR-150[4] | 11 | TL[1] | 90 | DMF[13] | 20 |
| U-2 | P-1 | 100 | CR-150 | 25 | TL | 90 | DMF | 30 |
| U-3 | P-1 | 100 | CR-5[5] | 11 | TL | 90 | DMF | 20 |

TABLE 4-continued

| Product No. | Isocyanate compound | | High polymeric compound | | Solvent | | | |
|---|---|---|---|---|---|---|---|---|
| | Name | Amount (g) | Name | Amount (g) | Name | Amount (g) | Name | Amount (g) |
| U-4 | P-1 | 100 | CR-150 | 11 | TL | 90 | DMA[14] | 20 |
| U-5 | P-1 | 100 | CR-150 | 11 | TL | 90 | NMP[15] | 20 |
| U-6 | P-1 | 100 | — | — | TL | 90 | DMF | 10 |
| U-7 | P-1 | 100 | — | — | TL | 90 | DMF | 25 |
| U-8 | P-2 | 100 | CR-150 | 11 | TL | 90 | DMF | 20 |
| U-9 | P-3 | 100 | CR-150 | 11 | MEK[12] | 90 | DMF | 20 |
| U-10 | P-4 | 100 | CR-150 | 11 | TL | 90 | DMF | 20 |
| U-11 | P-5 | 100 | CR-150 | 11 | TL | 90 | DMF | 20 |
| U-12 | P-6 | 100 | CR-150 | 11 | TL | 90 | DMF | 20 |
| U-13 | P-7 | 100 | CR-150 | 11 | TL | 90 | DMF | 20 |
| U-14 | P-8 | 100 | CR-150 | 11 | TL | 90 | DMF | 20 |
| U-15 | P-1 | 100 | Superkuron 106H[6] | 11 | TL | 90 | DMF | 20 |
| U-16 | P-1 | 100 | Superkuron 510[7] | 11 | TL | 90 | DMF | 20 |
| U-17 | P-1 | 100 | G-1 | 50 | TL | 100 | DMF | 10 |
| U-18 | P-2 | 100 | G-2 | 50 | TL | 100 | DMF | 10 |
| U-19 | P-3 | 100 | G-3 | 50 | TL | 100 | DMF | 10 |
| U-20 | P-4 | 100 | G-3 | 50 | TL | 100 | DMF | 10 |
| U-21 | P-6 | 100 | G-3 | 50 | TL | 100 | DMF | 10 |
| U-22 | P-9 | 100 | G-3 | 50 | TL | 100 | DMF | 10 |
| U-23 | P-10 | 100 | G-3 | 50 | TL | 100 | DMF | 10 |
| U-24 | P-11 | 100 | G-3 | 50 | TL | 100 | DMF | 10 |
| U-25 | PAPI[1] | 100 | G-1 | 50 | TL | 100 | DMF | 10 |
| U-26 | PAPI | 100 | G-2 | 50 | TL | 100 | DMF | 10 |
| U-27 | PAPI | 100 | G-3 | 50 | TL | 100 | DMF | 10 |
| U-28 | PAPI | 100 | G-4 | 50 | TL | 100 | DMF | 10 |
| U-29 | PAPI | 100 | G-5 | 50 | TL | 100 | DMF | 10 |
| U-30 | PAPI | 100 | G-6 | 50 | TL | 100 | DMF | 10 |
| U-31 | PAPI | 100 | G-7 | 50 | TL | 100 | DMF | 10 |
| U-32 | PAPI | 100 | G-3 | 10 | TL | 100 | DMF | 10 |
| U-33 | PAPI | 100 | G-3 | 100 | TL | 100 | DMF | 10 |
| U-34 | PAPI | 100 | G-3 | 150 | TL | 100 | DMF | 10 |
| U-35 | PAPI | 100 | G-4 | 100 | TL | 100 | DMF | 10 |
| U-36 | PAPI | 100 | G-4 | 50 | MEK | 100 | DMF | 10 |
| U-37 | PAPI | 100 | G-4 | 50 | TL | 100 | DMA | 10 |
| U-38 | PAPI | 100 | H-1[8] | 10 | — | — | — | — |
| U-39 | PAPI | 100 | H-4[9] | 10 | TL | 100 | DMA | 10 |
| U-40 | PAPI | 100 | H-7[10] | TL | 100 | DMA | 10 | |
| U-41 | MDI[2] | 100 | G-2 | 50 | TL | 100 | DMF | 10 |
| U-42 | 80/20-TDI | 100 | G-2 | 100 | TL | 100 | DMF | 10 |
| U-43 | 143 L[3] | 100 | G-3 | 50 | TL | 100 | DMF | 10 |

Notes of Table 4:
[1]Crude MDI, manufactured by The Upjohn Co., sold under the registered trade mark of PAPI-135.
[2]Pure-MDI, manufactured by The Upjohn Co., sold under the trading name of 125 M.
[3]Carbodiimide-modified MDI, manufactured by The Upjohn Co. 143 L is the registered trademark.
[4]Trading name of chlorinated rubber manufactured by Asahi Danka Kogyo Co.
[5]the same as above.
[6]Trading name of chlorinated polypropylene, manufactured by Sanyo Kokusaku Pulp Co.
[7]Trading name of chlorinated polyethylene, manufactured by Sanyo Kokusaku Pulp Co.
[8]Trading name of product of ring-opening polymerization of caprolactone of number average molecular weight of 10,000, manufactured by Daisel Ltd.
[9]The same as above, except for number average molecular weight of 40,000.
[10]the same as above, except for number average molecular weight of 70,000.
[11]Toluene
[12]Methyl ethyl ketone
[13]Dimethylformamide
[14]Dimethylacetoamide
[15]N—Methylpyrrolidone III. Preparation of the raw material for polyurethane elastomer (III-I) Preparation of T-liquid and R-liquid 10 kg of polytetramethylene ether glycol (hereinafter referred to as PTMG) of average molecular weight of 1,000 was mixed with 5 kg of 80/20-TDI, and the mixture was heated at 70° C. for 4 hours to obtain a urethane prepolymer having terminal isocyanate groups and NCO % of 10.5%. The thus obtained product was cooled to 30° C., and degassed while stirring under a reduced pressure of 20 mmHg to remove entrapped air to prepare T-liquid.

On the other hand, 7.5 kg of PTMG of average molecular weight of 1,000 was mixed with 2.5 kg of methylenebis (o-chloroaniline) and 30 g of diazabicyclooctane, and the mixture was heated to 100° C. to obtain a uniform liquid. After cooling the liquid to 30° C., it was degassed while stirring under a reduced pressure of 20 mmHg to remove entrapped air to prepare R-liquid.

(III-II) Preparation of M-liquid and G-liquid 10 kg of the same PTMG as in (III-I) was mixed with 10 kg of diphenylmethane diisocyanate, and the mixture was heated as in (III-I) to obtain a urethane prepolymer having terminal isocyanate groups and NCO % of 12.5%. The reaction mixture was treated as in (III-I) to prepare M-liquid.

On the other hand, 850 g of the same PTMG as used for preparing R-liquid in (III-I), 150 g of diethylene glycol and 3 g of diazabicyclooctane were mixed, and the mixture was heated to 70° C. to obtain a uniform solution. By treating the solution in the same manner as in (III-I), G-liquid was obtained.

EXAMPLE 1

The surface of a steel plate was blasted with sand by using pneumatic shot blaster. After removing residual oil on the surface by washing with methylene chloride, a uniform liquid (primary primer) obtained by sufficiently mixing 100 g of Major component E-1 prepared in I-A of Preparative Example and 53 g of Hardening agent A-2 prepared in I-B also of Preparative Example was coated on the surface of the steel plate with a brush, and the coated steel plate was dried in an oven at 60° C. for 30 min. The thickness of the dried film of the primary primer was about 100 microns.

Then, the secondary primer U-1 prepared in II-C of Preparative Example was coated on the thus coated steel plate and left for about 10 min. The thickness of dried film of the secondary primer was 30 microns.

On the other hand, 200 g of T-liquid and 140 g of R-liquid prepared in III of Preparative Example were mixed under vigorous stirring while preventing the intermixing of air and then the bubbles entrapped during the mixing was rapidly removed under a reduced pressure of 1 mmHg to obtain a liquid mixture, which was then poured onto the coated film of the secondary primer U-1 on the steel plate to form a layer of 5 mm in thickness. The thus treated steel plate was left for 7 days in an atmosphere of 25° C. and 50% RH.

A specimen of 25 mm in width and 150 mm in length cut out from the thus prepared adhered composite article was subjected to 180° peel test following the method of the Japanese Industrial Standards (JIS) K-6301 at a cross-head speed of 50 mm/min to show the peel strength of more than 16 kg/cm. The polyurethane elastomer of the specimen was destructed over 16 kg/cm of the stress (the test is referred to as peel test in the ordinary state).

After soaking the other specimen of the same size in water of 50° C. for 30 days, the specimen was conditioned in an atmosphere of 25° C. and 50% RH for 2 days, and subjected to the peel test to show the peel strength of more than 12 kg/cm, the polyurethane elastomer of the specimen having been destructed over 12 kg/cm of the stress(the test is referred to as peel test after soaking in water).

EXAMPLES 2 to 62

While using metal plates, primary primers, secondary primers and polyurethane elastomers shown in Table 5, the polyurethane elastomers were respectively adhered to the metal plates in the same manner as in Example 1. In these examples, the heating of the primary primer was carried out at 60° C. in Examples 2 to 30 and at 80° C. in Examples 31 to 62, and the days for leaving after casting the polyurethane elastomer were 7 days in Examples 2 to 30, and 14 days in Examples 31 to 62. The adhesive strength was determined in the same manner as in Example 1, and the results are shown in Table 5 which also includes the results of Example 1.

The recipe for the adhesion of the polyurethane elastomer to the metal plate is as follows:

| 1. Primary primer: | | |
|---|---|---|
| Major component | | 100 g |
| Hardening agent in | Examples 1, 28 and 31 | 53 g |
| | Example 2 | 37 g |
| | Example 3 | 30 g |
| | Example 4 | 86 g |
| | Example 5 | 84 g |
| | Examples 6 and 8 | 75 g |
| | Example 7 | 70 g |
| | Examples 9, 32, 34–57, 59 & 62 | 20 g |
| | Examples 10, 12, 13, 15–27, 29 & 30 | 32 g |
| | Example 14 | 31 g |
| | Examples 33, 58, 60 & 61 | 40 g |
| 2. Polyurethane elastomer | | |
| The first component | | 200 g |
| The second component in | Examples 1–24 & 27–60 | 140 g |
| | Examples 25, 26, 61 & 62 | 125 g |

TABLE 5

Components used for the preparation of adhered composite article and physical properties thereof

| Example No. | Metal plate | Primary primer Major component | Primary primer Hardening agent | Secondary primer | Polyurethane elastomer First component | Polyurethane elastomer Second component | Strength of adhesion (kg/cm) Ordinary state | Strength of adhesion (kg/cm) After soaking in water |
|---|---|---|---|---|---|---|---|---|
| 1 | steel | E-1 | A-2 | U-1 | T | R | >16 | >12 |
| 2 | steel | E-2 | A-2 | U-1 | T | R | >16 | >12 |
| 3 | steel | E-3 | A-2 | U-1 | T | R | >16 | >12 |
| 4 | steel | E-5 | A-2 | U-1 | T | R | >16 | >13 |
| 5 | steel | E-6 | A-2 | U-1 | T | R | >16 | >13 |
| 6 | steel | E-7 | A-2 | U-1 | T | R | >16 | >13 |
| 7 | steel | E-8 | A-2 | U-1 | T | R | >16 | >12 |
| 8 | steel | E-8 | A-2 | U-1 | T | R | >16 | >12 |
| 9 | steel | E-1 | A-1 | U-2 | T | R | >16 | >13 |
| 10 | steel | E-5 | A-1 | U-2 | T | R | >16 | >13 |
| 11 | steel | E-7 | A-1 | U-2 | T | R | >16 | >13 |
| 12 | steel | E-5 | A-1 | U-3 | T | R | >16 | >13 |
| 13 | steel | E-5 | A-1 | U-4 | T | R | >16 | >13 |
| 14 | steel | E-6 | A-1 | U-5 | T | R | >16 | >13 |
| 15 | steel | E-5 | A-1 | U-6 | T | R | >16 | >13 |
| 16 | steel | E-5 | A-1 | U-7 | T | R | >16 | >13 |
| 17 | steel | E-5 | A-1 | U-8 | T | R | >16 | >12 |
| 18 | steel | E-5 | A-1 | U-9 | T | R | >16 | >12 |
| 19 | steel | E-5 | A-1 | U-10 | T | R | >16 | >12 |
| 20 | steel | E-5 | A-1 | U-11 | T | R | >16 | >12 |
| 21 | steel | E-5 | A-1 | U-12 | T | R | >16 | >12 |
| 22 | steel | E-5 | A-1 | U-13 | T | R | >16 | >12 |
| 23 | steel | E-5 | A-1 | U-14 | T | R | >16 | >12 |
| 24 | steel | E-5 | A-1 | U-15 | T | R | >16 | >12 |
| 25 | steel | E-5 | A-1 | U-6 | M | G | >15 | >10 |
| 26 | aluminum | E-5 | A-1 | U-6 | M | G | >15 | >10 |

TABLE 5-continued

Components used for the preparation of adhered composite article and physical properties thereof

| Example No. | Metal plate | Primary primer Major component | Primary primer Hardening agent | Secondary primer | Polyurethane elastomer First component | Polyurethane elastomer Second component | Strength of adhesion (kg/cm) Ordinary state | Strength of adhesion (kg/cm) After soaking in water |
|---|---|---|---|---|---|---|---|---|
| 27 | aluminum | E-5 | A-1 | U-6  | T | R | >16 | >12 |
| 28 | aluminum | E-1 | A-2 | U-1  | T | R | >16 | >12 |
| 29 | steel    | E-5 | A-1 | U-16 | T | R | >16 | >12 |
| 30 | aluminum | E-5 | A-1 | U-16 | T | R | >16 | >12 |
| 31 | steel    | E-1 | A-2 | U-17 | T | R | >16 | >10 |
| 32 | steel    | E-4 | A-1 | U-18 | T | R | >16 | >12 |
| 33 | steel    | E-4 | A-3 | U-19 | T | R | >16 | >12 |
| 34 | steel    | E-4 | A-1 | U-20 | T | R | >16 | >12 |
| 35 | steel    | E-5 | A-1 | U-21 | T | R | >16 | >12 |
| 36 | steel    | E-5 | A-1 | U-22 | T | R | >16 | >12 |
| 37 | steel    | E-5 | A-1 | U-23 | T | R | >16 | >12 |
| 38 | steel    | E-5 | A-1 | U-24 | T | R | >16 | >12 |
| 39 | steel    | E-5 | A-1 | U-25 | T | R | >16 | >12 |
| 40 | steel    | E-5 | A-1 | U-26 | T | R | >16 | >12 |
| 41 | steel    | E-5 | A-1 | U-27 | T | R | >16 | >12 |
| 42 | steel    | E-5 | A-1 | U-28 | T | R | >16 | >14 |
| 43 | steel    | E-5 | A-1 | U-29 | T | R | >16 | >14 |
| 44 | steel    | E-5 | A-1 | U-30 | T | R | >16 | >12 |
| 45 | steel    | E-5 | A-1 | U-31 | T | R | >16 | >14 |
| 47 | steel    | E-5 | A-1 | U-33 | T | R | >16 | >12 |
| 48 | steel    | E-5 | A-1 | U-34 | T | R | >16 | >12 |
| 49 | steel    | E-5 | A-1 | U-35 | T | R | >16 | >14 |
| 50 | steel    | E-5 | A-1 | U-36 | T | R | >16 | >14 |
| 51 | steel    | E-5 | A-1 | U-37 | T | R | >16 | >14 |
| 52 | steel    | E-5 | A-1 | U-38 | T | R | >16 | >12 |
| 53 | steel    | E-5 | A-1 | U-39 | T | R | >16 | >12 |
| 54 | steel    | E-5 | A-1 | U-40 | T | R | >16 | >12 |
| 55 | steel    | E-5 | A-1 | U-41 | T | R | >16 | >12 |
| 56 | steel    | E-5 | A-1 | U-42 | T | R | >16 | >7  |
| 57 | steel    | E-5 | A-1 | U-43 | T | R | >16 | >13 |
| 58 | steel    | E-5 | A-3 | U-27 | T | R | >16 | >12 |
| 59 | aluminum | E-5 | A-1 | U-27 | T | R | >16 | >12 |
| 60 | aluminum | E-5 | A-3 | U-27 | T | R | >16 | >12 |
| 61 | aluminum | E-5 | A-3 | U-27 | M | G | >16 | >12 |
| 62 | steel    | E-5 | A-1 | U-27 | M | G | >16 | >12 |

EXAMPLE 63

On a similar steel plate treated with the same procedures as in Example 1, an polyurethane elastomer was adhered by the same process as in Example 1 except for using as the primary primer a uniform liquid obtained by sufficiently mixing 100 g of a liquid corresponding to E-1, however, not containing any silane coupling agent and 53 g of A-2. The specimen from the thus prepared adhered composite article was subjected to the same peel test in the ordinary state as in Example 1. The polyurethane elastomer was destructed at a stress over 16 kg/cm.

On the other hand, when the specimen was subjected to the peel test after soaking in water as in Example 1, separation occurred between the steel plate and the primary primer at a stress of 1 kg/cm.

COMPARATIVE EXAMPLE 1

Polyurethane elastomer was adhered to a steel plate in the same manner as in Example 1 except for not using the secondary primer. The result of the peel test in the ordinary state of the specimen of the thus prepared material showed the adhesive strength of only 1 kg/cm.

COMPARATIVE EXAMPLE 2

On a similar steel plate used in Example 1, a liquid mixture of 100 g of E-4 and 20 g of A-1 was coated as the primary primer with a brush, and the thus painted plate was dried for one hour at 80° C. Onto the thus coated plate, a liquid mixture of 100 g of crude MDI (PAPI-135), 25 g of polypropylene glycol (average molecular weight of 4,000), 100 g of toluene and 10 g of dimethylformamide was coated as the second primer, and the thus coated plate was left as it is for 30 min. at a room temperature. Then, the same raw material polyurethane elastomer as in Example 1 was casted on the plate as in Example 1, and the cast article was left as it is for 14 days. The result of the peel test in the ordinary state as in Example 1 showed the adhesive strength of only one kg/cm.

EXAMPLE 64

Onto a similar steel plate to that used in Example 1, a liquid mixture obtained by mixing 50 g of a compound corresponding to E-5 but containing no silane coupling agent and 10 g of A-1 was coated as the primary primer, and the thus coated plate was dried for one hour at 80° C. The dried film of the primary primer was 50 microns in thickness. Onto the thus coated plate, a liquid mixture obtained by mixing 100 g of P-1, 90 g of toluene and 20 g of dimethylformamide was coated as the secondary primer. After leaving the thus coated plate for 30 min. at a room temper-ature, the raw material for polyurethane elastomer was cast in a similar manner as in Example 1 onto the plate, and the plate was conditioned in an atmosphere of 25° C. and 60% RH for 7 days. After heating the thus conditioned plate at 100° C. for one hour, the adhered composite article was subjected to the peel test in an ordinary state as in Example 1. The adhesive strength was more than 16 kg/cm. The adhesive strength according to the peel test after soaking in water was more than 12 kg/cm. In the case where the plate was not heated after casting raw material for polyurethane elastomer, it took about 20 days to exhibit the same adhesive strength as above value.

What is claimed is:

1. A process for adhering polyurethane elastomer to metal, which comprises:
    coating the surface of the metal with a composition-A containing a polyepoxy compound, a polyamine compound and a silane coupling agent;
    drying the thus coated surface of the metal;
    further coating the dried surface of the metal with a composition-B containing an isocyanate compound having a concentration of isocyanate groups of 15–50% by weight and at least one compound selected from the group consisting of polyester and polyurethane, each having a weight average molecular weight of more than 10,000;
    drying the thus double-coated surface of the metal;
    casting a raw material for a polyurethane elastomer onto the thus dried surface of the metal; and
    hardening said cast raw material.

2. The process according to claim 1, wherein the polyepoxy compound is a reaction product of epichlorohydrin and polyphenolic resin and the polyamine compound is a member selected from the group consisting of xylylenediamine and a compound having terminal amino groups obtained by reacting a part of xylylenediamine with an epoxy compound.

3. The process according to claim 1, wherein the isocyanate compound having a concentration of isocyante group of 15 to 50% by weight is a member selected from the group consisting of diphenylmethane diisocyanate, crude-MDI, carbodiimide-modified diphenylmethane diisocyanate and urethane prepolymer thereof.

4. The process according to claim 1, wherein the elastomer is hardened at an ordinary room temperature.

5. The process according to claim 1, wherein the metal is iron, steel or aluminum.

6. A process for adhering polyurethane elastomer to metal, which comprises:
    coating the surface of the metal with a composition-A containing a polyepoxy compound, a polyamine compound selected from the group consisting of diethylenetriamine, tetraethylenepentamine, hexamethylenediamine, propylenediamine, trimethylhexamethylenediamine, isophoronediamine, menthenediamine, xylylenediamine, the reaction product of one of said polyamines with an epoxy compound, an amino group containing compound formed by the reaction of a dicarboxylic acid and a polyamine, a compound formed by the reaction of formaldehyde, a phenolic compound and a secondary amine and a polyamine obtained by the reaction of an aromatic amine and an aldehyde, and a silane coupling agent;
    drying the thus coated surface of the metal;
    further coating the dried surface of the metal with a composition-B containing an isocyanate compound having a concentration of isocyanate groups of 15–50% by weight and at least one compound selected from the group consisting of polyester and polyurethane, each having a weight average molecular weight of more than 10,000;
    drying the thus double-coated surface of the metal;
    casting a raw material for a polyurethane elastomer onto the thus dried surface of the metal; and
    hardening said cast raw material.

7. A composite article of an adherent elastomer layer on a metal substrate obtained by a process, comprising:
    coating the surface of the metal with a composition-A containing a polyepoxy compound, a polyamine compound and a silane coupling agent;
    drying the coated surface of the metal;
    further coating the dried surface of the metal with a composition-B containing an isocyanate compound having a concentration of isocyanate groups of 15–50% by weight and at least one compound selected from the group consisting of polyester and polyurethane, each having a weight average molecular weight of more than 10,000;
    drying the thus double-coated surface of the metal;
    casting a raw material for a polyurethane elastomer onto the dried isocyanate layer of the metal; and
    hardening said cast raw material.

* * * * *